US006839878B1

(12) United States Patent
Icken et al.

(10) Patent No.: US 6,839,878 B1
(45) Date of Patent: Jan. 4, 2005

(54) MECHANISM FOR DISPLAYING CONTENT USING CONTROL STRUCTURE FOR AUTHORING SYSTEMS

(75) Inventors: Donald A. Icken, Carmel, NY (US); Neal M. Keller, Somers, NY (US); Lisa M. Ungar, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,410

(22) Filed: May 8, 2000

(51) Int. Cl.[7] .............................................. G06F 15/00
(52) U.S. Cl. ................... 715/501.1; 715/530; 715/511; 707/2
(58) Field of Search ............................. 715/501.1, 530, 715/511, 512; 707/2, 203

(56) References Cited

U.S. PATENT DOCUMENTS

| | | | |
|---|---|---|---|
| 5,073,933 A | | 12/1991 | Rosenthal |
| 5,802,299 A | | 9/1998 | Logan et al. |
| 6,064,656 A | * | 5/2000 | Angal et al. ................. 370/254 |
| 6,088,702 A | | 7/2000 | Plantz et al. |
| 6,314,409 B2 | * | 11/2001 | Schneck et al. ............... 705/54 |
| 6,476,833 B1 | * | 11/2002 | Moshfeghi ................... 345/854 |
| 6,513,016 B1 | * | 1/2003 | Freeny, Jr. .................... 705/26 |
| 6,587,849 B1 | * | 7/2003 | Mason et al. ................... 707/5 |
| 6,625,603 B1 | * | 9/2003 | Garg et al. ..................... 707/9 |
| 6,632,251 B1 | * | 10/2003 | Rutten et al. ................ 715/530 |
| 6,662,181 B1 | * | 12/2003 | Icken et al. ..................... 707/9 |

OTHER PUBLICATIONS

"Managing Large WWW Sites", Prevelakis V, Internet Research: Electronic Networking Applications and Policy, vol. 9, Issue 1, 1999, ISSN 1066–2243, at http://hagar.u-p.ac.az/catts/ole/management/prevelakis.htm.

British Official Action dated Feb. 3, 2004 Vassilis Prevelakis, "Managing Large WWW Sites", Internet Research: Electronic Networking Applications and Policy, vol. 9, Issue 1 (1999).

* cited by examiner

*Primary Examiner*—Stephen S. Hong
*Assistant Examiner*—Matthew Ludwig
(74) *Attorney, Agent, or Firm*—Scully, Scott, Murphy & Presser; Daniel P. Morris

(57) ABSTRACT

The field of distributed authoring systems, and more particularly the implementing of authoring controls within the authoring system. Moreover, there is provided a selection mechanism which employs control structures for dynamically selecting content and supplying display components to form a customized and dynamically changeable display on a display mechanism of said authoring system.

24 Claims, 3 Drawing Sheets

MECHANISM FOR DISPLAYING CONTENT USING CONTROL STRUCTURE FOR AUTHORING SYSTEMS

BACKGROUND OF THE INVENTION

1. Field of the Invention

The present invention relates to the field of distributed authoring systems, and more particularly pertains to the implementing of authoring controls within the authoring system. Moreover, the invention is directed to providing the authoring system with an improved and novel mechanism for displaying content using access control structures for the authoring system.

In essence, authoring systems, which may also be known as authoring tools or authorware in technological and commercial applications, may be programs existing in hypertext and multimedia applications. Pursuant to more sophisticated applications, in internet, on-line or CD-ROM programs, the authoring systems may be scripting language or graphics elements, or may even represent a mixture of textual (teaching tools, printed works and the like) material, graphical representations, audio data and numerous, practically unlimited types of objects or programs. These authoring systems are ordinarily developed and designed by authors who define the relationships of the foregoing aspects with each other, and sequencing the programs in an appropriate order for data storage.

2. Discussion of the Prior Art

In the present state of the technology and industry, authoring systems are adapted to control authoring access, generally to an authoring system utilizing various control parameters such as check-in/check-out, access control lists, profiles and predefined roles which are assigned to various authors of the system.

In various of the presently developed and known authoring systems, the access control mechanisms which facilitate access to the authoring system are specified or predefined by the system itself; whereas, other authoring systems do not provide access control systems or similar arrangements.

For instance, presently employed authoring systems utilize so-called content marking architectures which possess the capability of using content marking to control shared authoring functionality and end user display, but have not implemented any such system. Existing systems define a predetermined number of attributes which can be assigned to a predetermined set of contents, and used by a predetermined set of logic so as to control display of the marked content in a predetermined manner. However, the foregoing concept which is evident in the current state-of-the technology, is limited in scope and in inherent aspects of not providing control structures for dynamically changing a display through a suitable selection mechanism of the authoring system.

SUMMARY OF THE INVENTION

In order to obviate and overcome the limitations encountered in present authoring systems, a primary aspect of the present invention resides in the provision of an improved mechanism for displaying content using access control structures for the system. The mechanisms incorporated in the system enables one or more users, such as readers or authors, to gain access to the authoring system, whereby multiple users may be afforded serial access the authoring system; or users may access the authoring system simultaneously or in an overlapping order in accordance with predetermined criteria or conditions established by the control structure or mechanisms of the authoring systems.

In essence, the authoring system utilizes different parameters or criteria in order to provide a reader or author (user) access thereto through the control structure pursuant to the invention. Basically, these parameters or criteria include:

a) Userid (User identification)—which is designed to uniquely identify a user or number of users intending to gain permission for access to the authoring system;

b) Active flag—providing for indication that a particular user is logged into the authoring system;

c) Role—is utilized to group users by related functionality, which is implemented by attributes, logic and values, as defined hereinbelow;

d) Attribute—is a named field which is associated with content, display components, and/other system elements; and is utilized to tag or impart a set of values with a specific meaning or meanings;

e) Logic—utilizes boolean logic in order to test a given value against the value of a corresponding attribute in content, display component and/or other system element;

f) Value—defines a constant which is utilized in tabled logic, which is compared with corresponding constants which are assigned to content, display component or system element attributes;

g) Choice components—defines a list of that display component or those display components available to a role for both selection and display mechanisms, and which ties specific display logic to content attributes;

h) Which display component—list of which particular set of logic is to be used against the attribute in the display mechanism;

i) Permissions—to implement the "access authority of the system" for a specific role as set forth in c) hereinabove.

The foregoing parameters or criteria are employed in that an access control engine in operative connection with a selection mechanism pursuant to the invention, resolves access control or privileges in the authoring system, utilizing information from both an active user table and an access control structure table. In that instance, the roles are a membership structure utilized to group common functionality and to tie logic to attributes and values. Thus, the roles set forth in an access control table eliminate the need for author profiles in the authoring system, and by introducing logic and display components in the access control engine it is possible to obviate the need for having to execute logic subsequently, as do databases with their views. In the present authoring system, there is no distinction between authors and readers, and a person designated to multiple roles is imparted the combined functionality of all of the roles. Hereby, functionality defined by the attributes, logic and values, and wherein every access is conveyed to the inventive access control engine, imparting the authoring system with the ability to dynamically reflect changes in the system and in which control structures, as well as outputs from a selection mechanism dynamically change a display of the content.

Accordingly, it is an object of the present invention to provide an improved and novel mechanism for displaying content using access control structures for authoring systems.

A further object of the present invention resides in the provision of an improved mechanism for displaying content using control structures which is as well as an output from the selection mechanism to dynamically change a display in the authoring system.

BRIEF DESCRIPTION OF THE DRAWINGS

Reference may now be had to the following detailed description of a preferred embodiment of a mechanism for displaying content using access control structures for an authoring system pursuant to the invention, taken in conjunction with the accompanying drawings; in which.

DETAILED DESCRIPTION OF A PREFERRED EMBODIMENT

Figure 1:
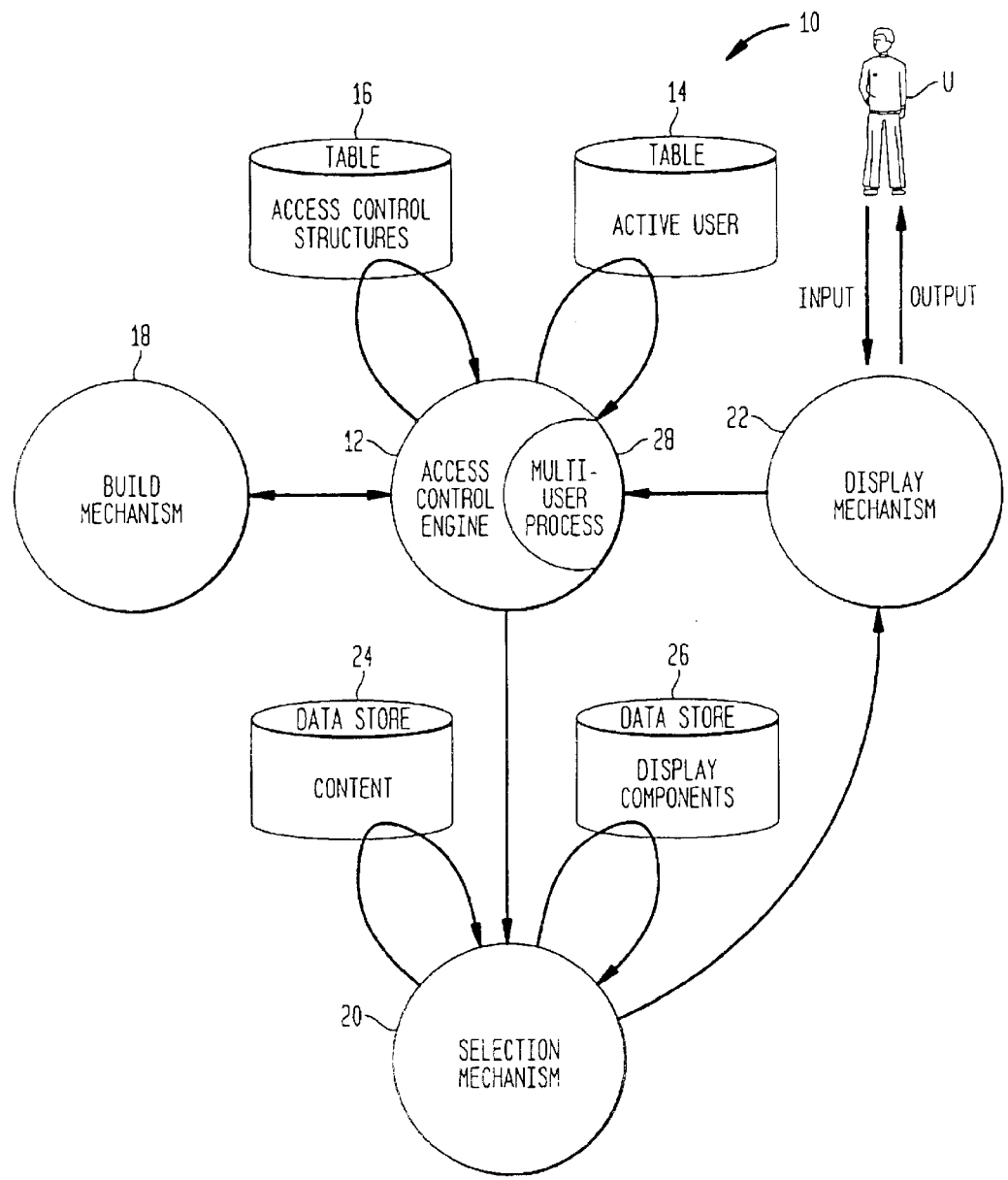
FIG. 1 illustrates, in a generally diagrammatic representation, an authoring system including a display mechanism interacting with other mechanisms pursuant to the invention.

Referring in detail to the drawings, and particularly FIG. 1, there is illustrated an authoring system 10 including an access control engine 12. The access control engine 12 resolves access control or privileges imparted to a user or plurality of users in the authoring system, utilizing information data, from both an active user table 14 and an access control structure table 16, and with the data flow represented by arrows between the components 12 and 14, and respectively, components 12 and 16 of the authoring system 10.

A build mechanism 18 provides for appropriate variable data information and instructions to be imparted to and from the access control engine 12 from an external source, and is adapted to introduce logic and display components into the access control engine.

A selection mechanism 20 derives appropriate information, for subsequent transmission to a display mechanism 22, from a data store 24 having attribute contents stored therein, and from a further data store 26 having display components stored therein for selectively relaying the foregoing data to the display mechanism 22. The latter conveys displaying information to a multi-user process system 28 in the access control engine 12.

Thus, as shown in particular, through the Active User Table 14, a user (i.e. reader, author) U may be assigned an active status by setting an Active Flag, indicating that the user has been logged into the authoring system 10 responsive to the Userid (User identification) assigned to the user.

The foregoing user assignment as shown in the table 14 may be for any number of users $U_1$, $U_2$, - - - $U_x$, who may be assigned different roles imparting access to the authoring system 10, which may be used to group users by related functionality, as defined by attributes, logic and values. Thus, the active user table 14 which identifies the Userid Active Flag and Role, leads to boolean logic to test a given value against a corresponding Attribute value in the content, display component and/or other authoring system constituents. The role assigned to a particular user may be predetermined by the data supplied to the access control engine 12 by the build mechanism 18, so as to impart to the user specific types of authorities, such as being capable of only reading the author material, or editing the author material at any particular site or sites.

Moreover, by way of example, a user or users may be imparted further roles enabling him or them to access author material at different geographic locations; for instance, a user in New York may be empowered to gain access to author material in New York, Chicago or Los Angeles. Moreover, the user may possibly be empowered to only "read" material in Chicago and Los Angeles, while being able to "edit" the author material in New York, although numerous permutations and different attributes may be assigned to any particular user or users at any specific location or locations in accordance with data supplied to the active user table 14 from the access control engine 12.

As illustrated in FIG. 1 of the drawings, the access control structure table 16 assigns to the particular user or users a role, various attributes, (boolean) logic values, choice components and permission for accessing which define the different types of access the user may have by means of the access control engine 12, wherein the table contains the foregoing information which has been imparted thereto through the access control engine 12 by data from the build mechanism 18, which was imputted from an external source or authority. In that instance, the build mechanism 18 assembles or builds the informative/data elements which are needed by the access control engine 12 to provide the required information and criteria to the remaining operative components of the authoring system 10. The selection mechanism 20, in turn, selects the content and display components based on information which is provided thereto by the access control engine 12. In turn, the display mechanism 22 builds or formulates a display which is based on information provided thereto by the selection mechanism 20. The multi-user process 28 of the authoring system utilizes the access control engine 12 in order to determine the relationship between the multiple authors to which access is to be gained.

Figure 2:
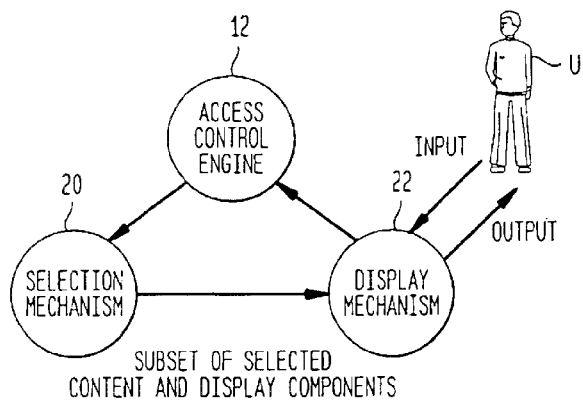
FIG. 2 illustrates the display mechanism part of the system pursuant to the invention.
Figure 3:
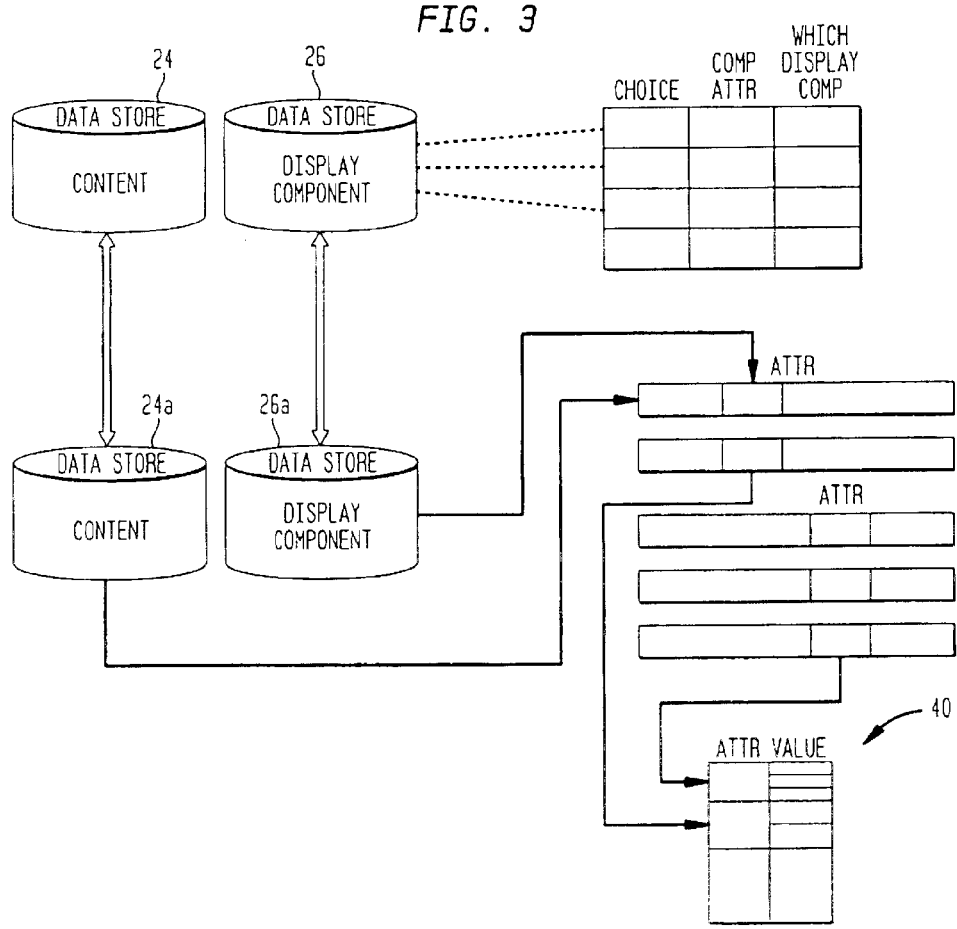
FIG. 3 illustrates a data flow scenario of the display mechanism.
Figure 4:
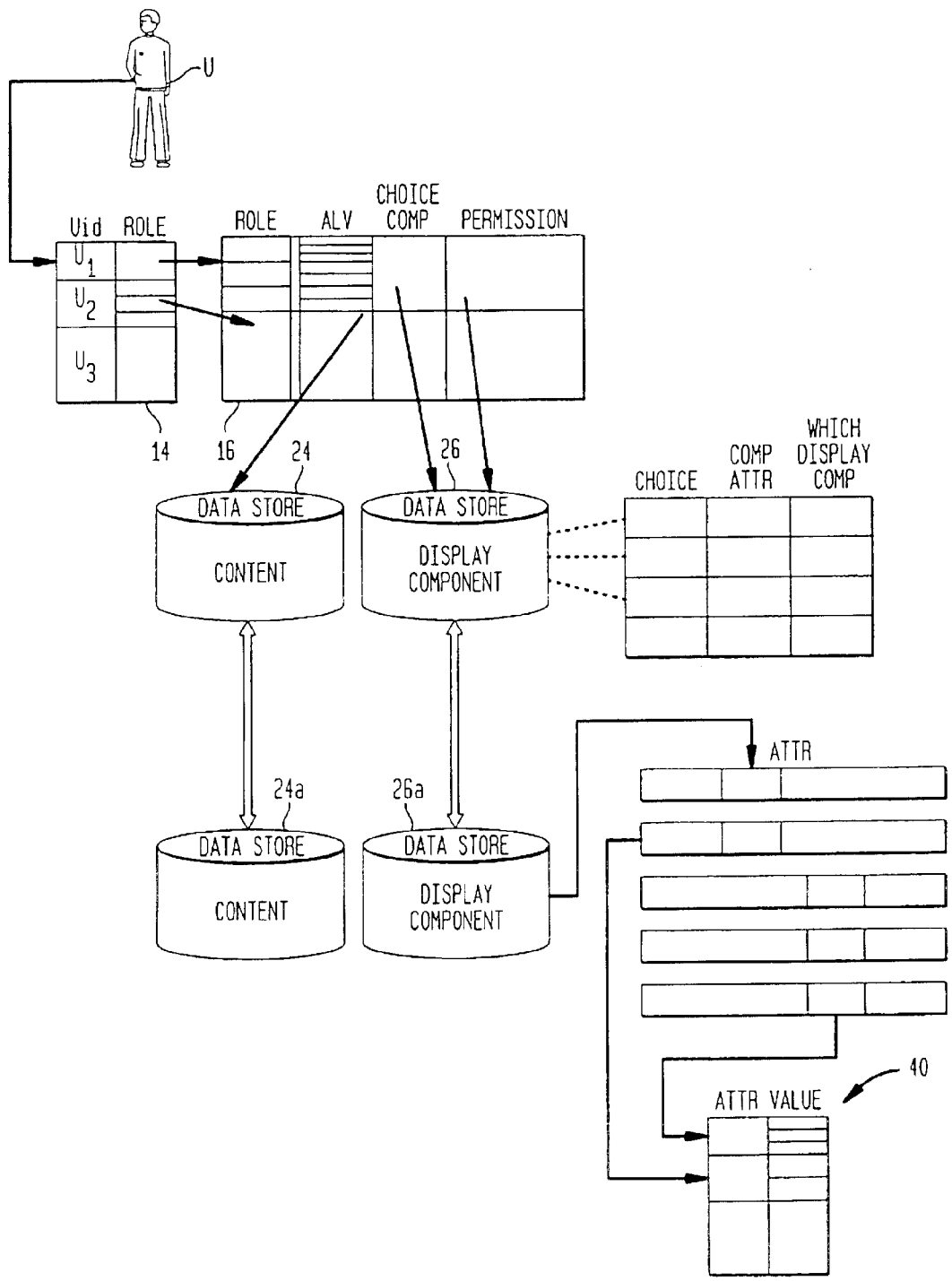
FIG. 4 illustrates a data flow scenario representing the relationship between the selection mechanism and display mechanism of the authoring system.

Referring now more specifically to FIG. 2 of the drawings, the display mechanism 22 which is operatively connected to the access control engine 12 so as to provide information to the latter, and which also receives information from the select mechanism including a subset of selected contents and display components which are to be displayed on a display mechanism, receives input and provides an output to a user of the authoring system. In essence, the display mechanism employs the output from the selection mechanism to effect a dynamic change in display based on various selected content and display components provided for by a user input which, in turn, is forwarded to the access control engine 12 and thereafter to the selection mechanism 20, and also in FIG. 3 to subsets of selected content 24a and display components 26a which, are then provided as an output from the display mechanism to a user wherein the selection mechanism dynamically changes the display in accordance with the desired contents selected by the user. The display mechanism 40 is used to create, build and modify the display based on the output from the selection mechanism. The selection mechanism selects a subset of content 24a from the content data store 24 and a subset of display components 26a from the display component data store 26 based on resolved control structures conveyed by the access control engine 12. The display mechanism uses the selected content and display components to build the display 40. The attribute names from the selected display components are referenced in the selected content. The resulting values associated with those content attributes are tested against the display component's logic to determine how the display component will be displayed. Using the logic, attributes and values the authoring display can be dynamically tied to the user's roles and the selected content, unlike other role based systems.

Reverting to a typical scenario in the application of the authoring system 10 through the intermediary of the mechanism for displaying content using access control structures, the following sequence of operating steps is set forth hereinbelow, and is also represented in the access control engine logic flow.

A. The Process Flow for the Display Mechanism Behaves as Follows

Step 1) The display mechanism receives a request from a user;

Step 2) The display mechanism passes the request received in Step 1) to the access control engine;

Step 3) The access control engine processes the request from Step 2) and passes the result to the selection mechanism;

Step 4) The selection mechanism queries the content data store and the display component table based on the information in Step 3) and passes the result to the display mechanism;

Step 5) The display mechanism receives the selected content and display components from the selection mechanism in Step 4);

Step 6) The display mechanism uses the attribute name from the display component to obtain associated values from the selected content;

Step 7) The logic in the display components is tested against the result from Step 6; and Step 8) Based on the result of Step 7), the display mechanism generates the display.

B. The Data Flow for the Selection Mechanism Behaves as Follows i) Through Access Control Engine An individual makes a request
Look for the individual's userid in the active user table
Get the associated role(s)
Find the corresponding role(s) in the access control table
Retrieve the associated logic(s) and choice component(s)
Resolve any inconsistent logic
Transform the logic(s) into a single logic.

(ii) Through Selection Mechanism

Test the single logic against the content in the content data store.
Select the content with results equal to true.
Using the choice components select the display components from the display components table.

(iii) Through Display Mechanism

Retrieve the attribute(s) and logic(s) from the selected display components.
Using the attributes, get the values of those attributes from the selected content.
Build a temporary table of the attribute values.
Apply the display component logic to the temporary attribute value table.
Build the display from the resulting display components and show the selected content.

While the invention has been particularly shown and described with respect to preferred embodiments thereof, it will be understood by those skilled in the art that the foregoing and other changes in form and details may be made therein without departing form the spirit and scope of the invention.

What is claimed is:

1. An authoring system including mechanisms for enforcing authoring controls so as to selectively impart access to one or more authors to said authoring system predicated on specific criteria, said system comprising:

a) an access control engine wherein Boolean logic changes dynamically in response to multiple roles and existing attributes and values to enable a single pass access;

b) a selection mechanism operatively connected to said access control engine for the purpose of using dynamic Boolean logic, control structures, and existing relationships with other authors to select content and display components; and c) a display mechanism connected to said selection mechanism, said display mechanism using attributes and logic from said display components, associated values from said selected content as well as logic, attributes and values from said roles to dynamically generate the authoring display, wherein said display mechanism which retrieves the attributes and logic from the selected display components, obtains the values of the corresponding attributes from the selected content, builds a temporary table of the attribute values, and thereafter applies the display component logic to a temporary attribute value table to dynamically build the display from the resulting display components to show the selected content.

2. An authoring system as claimed in claim 1, wherein single or multiple attributes with one or more values are names associated with content, display components, roles and control structures for customized access.

3. An authorizing system as claimed in claim 1, wherein roles interact with control structures, existing relationships with other authors and Boolean logic to generate dynamic selections of content and display components.

4. An authoring system as claimed in claim 3, wherein a single role is or multiple roles are affiliated with one or more authors and attributes.

5. An authoring system as claimed in claim 1, wherein the Boolean logic which changes dynamically in response to multiple roles and existing attributes and values, enables said single pass access to content and display components.

6. An authoring system as claimed in claim 1, wherein the authoring display is dynamically determined from selected content and display components.

7. A method of utilizing an authoring system including mechanisms for enforcing authoring controls so as to selectively impart access to one or more authors to said authoring system predicated on specific criteria, said method comprising:

a) providing an access control engine wherein Boolean logic changes dynamically in response to multiple roles and existing attributes and values to enable a single pass access;

b) operatively connecting a selection mechanism to said access control engine for the purpose of using dynamic Boolean logic, control structures, and existing relationships with other authors to select content and display components, and c) providing a display mechanism operatively connected to said selection mechanism, said display mechanism using attributes and logic from said display components, associated values from said selected content as well as logic, attributes and values from said roles to dynamically generate the authoring display, whereby said display mechanism which retrieves the attributes and logic from the selected display components, obtains the values of the corresponding attributes from the selected display content, builds a temporary table of the attribute values, and thereafter applies the display component logic to a temporary attribute value table to dynamically build the display from the resulting display components to show the selected content.

8. A method as claimed in claim 7, wherein single or multiple attributes with one or more values are names associated with content, display components, roles and control structures for customized access.

9. A method as claimed in claim 7, wherein roles interact with control structures, existing relationships with other authors and Boolean logic to generate dynamic selections of content and display components.

10. A method as claimed in claim 7, wherein a single role or multiple roles are affiliated with one or more authors and attributes.

11. A method as claimed in claim 7, wherein the Boolean logic changes dynamically in response to multiple roles and existing attributes and values to enable a single pass access to content and display components.

12. A method as claimed in claim 7, wherein the authorizing display is dynamically determined from selected content and display components.

13. A program storage device readable by machine, tangibly embodying a program of instructions executable by machine to perform a method for an authoring system including mechanisms for enforcing authoring controls so as to selectively impart access to one or more authors to said authoring system predicated on specific criteria, said system comprising:
 a) an access control engine wherein Boolean logic changes dynamically in response to multiple roles and existing attributes and values to enable a single pass access;
 b) a selection mechanism operatively connected to said access control engine for the purpose of using dynamic Boolean logic, control structures, and existing relationships with other authors to select content and display components; and
 c) a display mechanism connected to said selection mechanism, said display mechanism using attributes and logic from said display components, associated values from said selected content as well as logic, attributes and values from said roles to dynamically generate the authoring display, whereby said display mechanism which retrieves the attributes and logic from the selected display components, obtains the values of the corresponding attributes from the selected content, builds a temporary table of the attribute values, and thereafter applies the display component logic to a temporary attribute value table to dynamically build the display from the resulting display components to show the selected content.

14. A program storage device as claimed in claim 13, wherein single or multiple attributes with one or more values are names associated with content, display components, roles and control structures for customized access.

15. A program storage device as claimed in claim 13, wherein roles interact with control structures, existing relationships with other authors and Boolean logic to generate dynamic selections of content and display components.

16. A program storage device as claimed in claim 15, wherein a single role is or multiple roles are affiliated with one or more authors and attributes.

17. A program storage device as claimed in claim 13, wherein the Boolean logic changes dynamically in response to multiple roles and existing attributes and values to enable a single pass access to content and display components.

18. A program storage device as claimed in claim 13, wherein the authoring display is dynamically determined from selected content and display components.

19. A method of utilizing an authoring system, which is readable by machine tangibly embodying a program of instructions executable by the machine, including mechanisms for enforcing authoring controls so as to selectively impart access to one or more authors to said authoring system predicated on specific criteria, said method comprising:
 a) providing an access control engine wherein Boolean logic changes dynamically in response to multiple roes and existing attributes and values to enable a single pass access;
 b) operatively connecting a selection mechanism to said access control engine for the purpose of using dynamic Boolean logic, control structures, and existing relationships with other authors to select content and display components; and
 c) providing display mechanism operatively connected to said selection mechanism, said display mechanism using attributes and logic from said display components, associated values from said selected content as well as logic, attributes and values from said roles to dynamically generate the authoring display, whereby said improved display mechanism which retrieves the attributes and logic from the selected display components, obtains the values of the corresponding attributes from the selected content, builds a temporary table of the attribute values, and thereafter applies the display component logic to a temporary attribute value table to dynamically build the display from the resulting display components to show the selected content.

20. A method as claimed in claim 19, wherein single or multiple attributes with one or more values are names associated with content, display components, roles and control structures for customized access.

21. A method as claimed in claim 19, wherein roles interact with control structures, existing relationships with other authors Boolean logic to generate dynamic selections of content and display components.

22. A method as claimed in claim 21, wherein a single role or multiple roles are affiliated with one or more authors and attributes.

23. A method as claimed in claim 19, wherein the Boolean logic changes dynamically in response to multiple roles and existing attributes and values to enable a single pass access to content and display components.

24. A method as claimed in claim 19, wherein the authoring display is dynamically determined from selected content and display components.

* * * * *

UNITED STATES PATENT AND TRADEMARK OFFICE
CERTIFICATE OF CORRECTION

PATENT NO. : 6,839,878 B1
DATED : January 4, 2005
INVENTOR(S) : Donald A. Icken et al.

It is certified that error appears in the above-identified patent and that said Letters Patent is hereby corrected as shown below:

Column 5,
Line 63, "departing form the spirit" should read -- departing from the spirit --

Column 8,
Line 20, "roes" should read -- roles --

Signed and Sealed this

Seventeenth Day of May, 2005

JON W. DUDAS
*Director of the United States Patent and Trademark Office*